No. 675,536. Patented June 4, 1901.
J. W. BARNARD.
FARM HARROW.
(Application filed Dec. 20, 1900.)
(No Model.) 2 Sheets—Sheet 1.
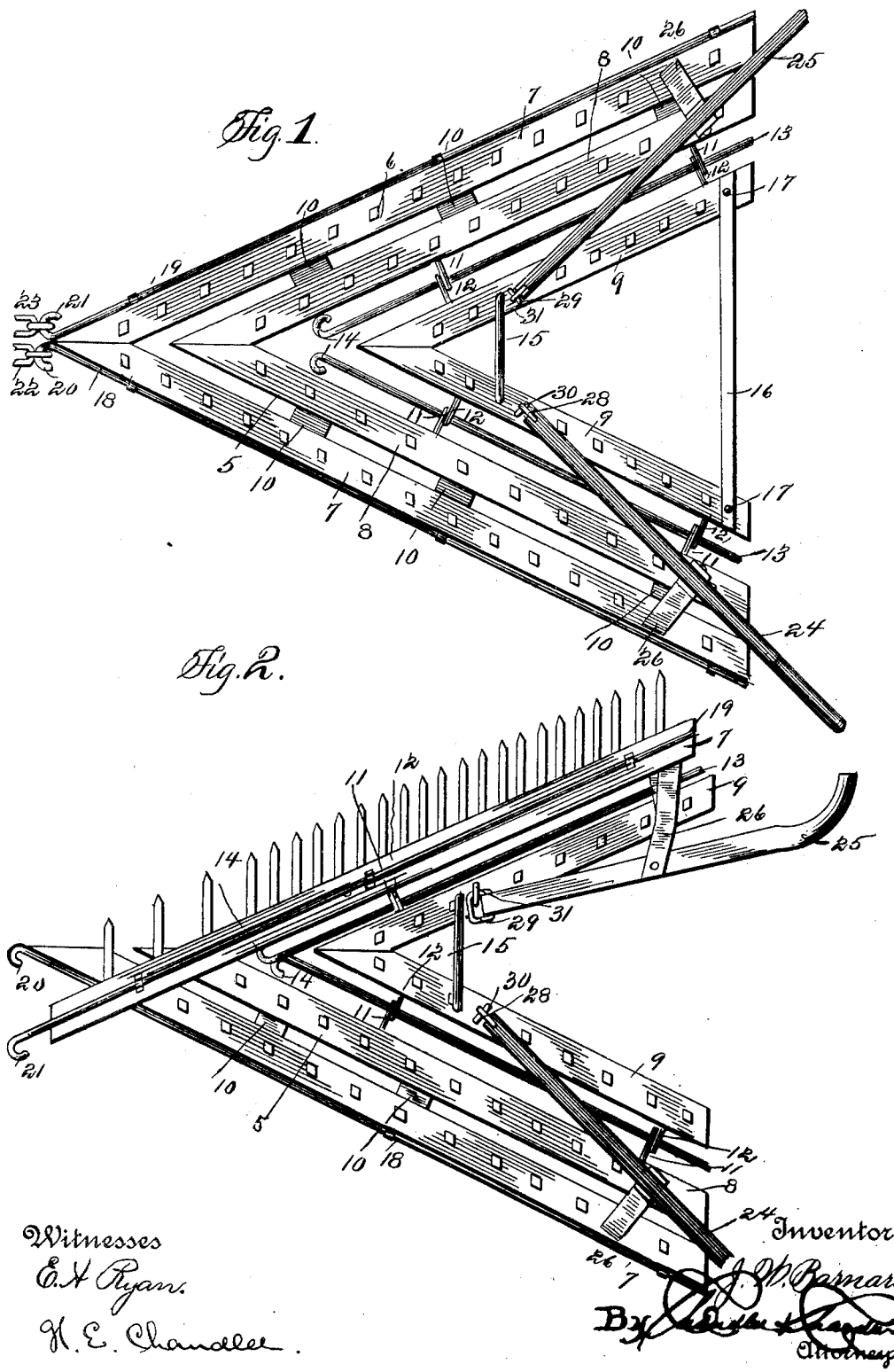
Witnesses
E. H. Ryan.
H. E. Chandler.
Inventor
J. W. Barnard
By [signature]
Attorney No. 675,536. Patented June 4, 1901.
J. W. BARNARD.
FARM HARROW.
(Application filed Dec. 20, 1900.)
(No Model.) 2 Sheets—Sheet 2.
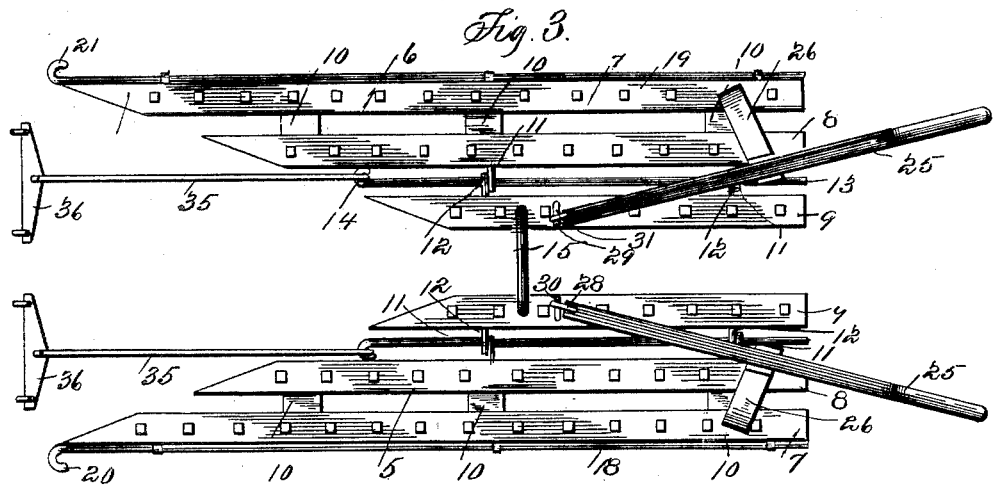
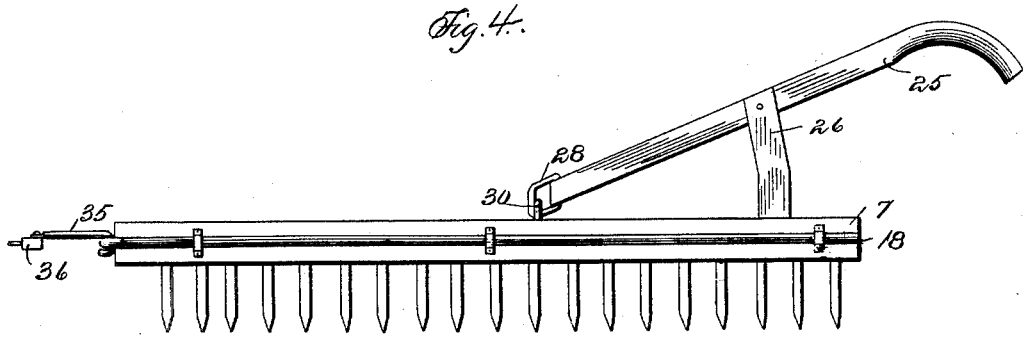
Witnesses
E. A. Ryan.
N. E. Chandler
Inventor
J. W. Barnard.
by ————— Attorney

UNITED STATES PATENT OFFICE.

JOHN W. BARNARD, OF EATON, TENNESSEE.

FARM-HARROW.

SPECIFICATION forming part of Letters Patent No. 675,536, dated June 4, 1901.

Application filed December 20, 1900. Serial No. 40,534. (No model.)

*To all whom it may concern:*

Be it known that I, JOHN W. BARNARD, a citizen of the United States, residing at Eaton, in the county of Gibson, State of Tennessee, have invented certain new and useful Improvements in Farm-Harrows; and I do hereby declare the following to be a full, clear, and exact description of the invention, such as will enable others skilled in the art to which it appertains to make and use the same.

This invention relates to harrows in general, and more particularly to that class designed for conversion to adapt them to different specific uses, the object of the invention being to provide a construction which may be used for harrowing fields after plowing, and which, furthermore, may be converted to such form as will permit its use for cultivating, further objects and advantages of the invention being evident from the following description.

In the drawings forming a portion of this specification, and in which like numerals of reference indicate similar parts in the several views, Figure 1 is a plan view showing the harrow in one form for use in general harrowing. Fig. 2 is a plan view showing one side of the harrow raised to clear a stump or other obstruction. Fig. 3 is a plan view showing the harrow converted for cultivating. Fig. 4 is a side elevation of the harrow in the form shown in Fig. 3.

Referring now to the drawings, and more particularly to Figs. 1 and 2 thereof, the harrow comprises two sections 5 and 6, each of the sections in the present instance including three parallel sills 7, 8, and 9, and these two sections are disposed with the corresponding sills at one end in mutual contact and with their opposite ends disposed divergingly. The meeting ends of the sills are cut at angles or mitered to cause them to lie evenly. The outside sills 7 and 8 of each section 5 and 6 are rigidly connected by means of cross-plates 10, while the innermost sill 9 of each section is hinged to the adjacent sill 8 of that section. This hinge connection of the sills 8 and 9 of each section is formed by means of eyebolts 11 and 12, which are engaged with the sills 8 and 9, respectively, with their eyes in alinement, and through these alined eyes are engaged rods 13, which form pintles for the hinges, the leaves of which are formed by the eyebolts. The forward ends of the bars or rods 13 are formed into hooks 14 for a purpose which will be presently explained, and said hooks lie between the forward ends of the sills 8 and 9.

The sills 9 of the two sections 5 and 6 of the harrow are connected near their forward ends by means of an arch or yoke 15, the downturned ends of which are pivotally engaged with the sills to permit of movement of the sills 9 into and out of parallelism, and to hold the said sills in mutual contact and divergent a brace bar or plate 16 is connected at its ends with the rear end portions of the sills 9 and may be held in place by means of bolts 17, as shown.

Along the outer sides of the sills 7 are secured the rods or draft-bars 18 and 19, at the forward ends of which are formed hooks 20 and 21, and with these hooks are engaged short chain-sections 22 and 23, connected at their outer ends to a draft-chain, (not shown,) and through the medium of which the harrow is drawn.

Handles 24 and 25 are mounted each in a brace 26, the legs of which are mounted upon the sills 7 and 8 of the corresponding section of the harrow, said handles converging forwardly and having rings 28 and 29 at their forward ends, which are engaged with eyes 30 and 31 upon the sills 9. These handles are adapted to be grasped by the operator and when an obstruction in front of either section of the harrow is reached the outer sills 7 and 8 of that section may be raised to the position shown in Fig. 2 of the drawings until the obstruction is passed, the manner of connecting the draft-chain with the draft-rods permitting this movement of either section of the harrow. The several sills may of course be provided with any suitable form of harrow-teeth that may be desired.

Referring now to Figs. 3 and 4 of the drawings, when the harrow is to be used in cultivating between the rows of growing crops the brace-rod 16 may be removed and the chain-sections 22 and 23 are disengaged from the hooks of the draft rods or bars, when draft-bars 35 are engaged with the hooks of the bars or rods 13, and to these draft-bars 35 are connected singletrees 36 for attachment of horses. The pivotal connection of the yoke 15 with the sills 9 permits them to assume a mutually-parallel position, and the line of draft on the rods or bars 13 is such as to maintain this correlation. In this position of the sections of the harrow also the outer sills 7 and 8 of either section may be raised pivotally upon the rods 13 to avoid an obstruction, as will be readily understood.

It will be understood that in practice various modifications of the specific construction shown may be made and that any suitable materials and proportions may be used for the various parts without departing from the spirit of the invention.

What is claimed is—

1. A harrow comprising two sections pivotally connected for movement to lie parallel or divergingly, each of said sections including a plurality of sills provided with teeth, hinge connections between certain of the sills of each section, and a handle connected with the hinged sills of each section and adapted for movement to adjust the hinged sills correlatively.

2. A harrow comprising two sections pivotally connected, means for holding the sections divergent, draft-rods connected with the outermost sills and adapted to lie with their forward ends in close proximity when the sections are divergent, additional draft-rods connected with the sections at their inner portions, and handles for the sections.

3. A harrow comprising two sections pivotally connected, each of the sections including sills, certain of the mutually adjacent sills having coöperating hinge-leaves, draft-rods passed through the leaves and forming pintles therefor, and connections between the sections of the harrow, the hinged sills of the harrow-sections having handles connected therewith for moving them upon their hinges.

4. A harrow comprising two sections each including a plurality of parallel sills having teeth, a yoke having its ends pivotally connected with the innermost sills of the sections, hinge-leaves connected with said innermost sills and the sills adjacent thereto, draft-rods engaged with the corresponding leaves to form pintles therefor, additional draft-rods connected with the outermost sills, handles connected with the hinged sills for moving them upon their hinges, and means for holding the innermost sills at times in fixed relation, said means being removable.

In testimony whereof I hereunto set my hand in the presence of two witnesses.

JOHN W. BARNARD.

Witnesses:
W. T. INGRAN,
J. N. HARRIS.